(12) United States Patent
Lee et al.

(10) Patent No.: US 6,853,652 B2
(45) Date of Patent: Feb. 8, 2005

(54) SPATIAL FILTERING OF LASER GHOSTS

(75) Inventors: Tzuo-Chang Lee, Shrewsbury, MA (US); Arkady Feldman, Stamford, CT (US)

(73) Assignee: Quantum Corporation, San Jose, CA (US)

( * ) Notice: Subject to any disclaimer, the term of this patent is extended or adjusted under 35 U.S.C. 154(b) by 389 days.

(21) Appl. No.: 09/892,599

(22) Filed: Jun. 27, 2001

(65) Prior Publication Data

US 2003/0002543 A1 Jan. 2, 2003

(51) Int. Cl.[7] .................................................. H01S 3/10
(52) U.S. Cl. ........................ 372/9; 372/28; 372/29.02; 372/32; 360/24; 360/30
(58) Field of Search ........................... 372/9, 28, 29.02, 372/32; 360/24, 30

(56) References Cited

U.S. PATENT DOCUMENTS 4,669,883 A * 6/1987 Ina et al. .................... 356/401
6,228,311 B1 * 5/2001 Temple et al. .............. 264/400
6,248,988 B1 * 6/2001 Krantz ....................... 250/201.3
2002/0167751 A1 * 11/2002 Lee et al. ................... 360/72.1

FOREIGN PATENT DOCUMENTS

JP    63136018 A  *  6/1988  ........... G02B/27/46

* cited by examiner

Primary Examiner—Tom Thomas
Assistant Examiner—Matthew E. Warren
(74) Attorney, Agent, or Firm—Morrison & Foerster LLP

(57) ABSTRACT

An optical servo writer system including a laser subsystem to generate a multiplicity of light beams, a lens positioned to receive and focus the light beams and a spatial filter positioned in the system so as to allow a subset of the light beams to pass through the filter. The multiplicity of light beams includes the subset that contains the desired beams, or the servo beams, and also the undesired beams, called the ghost beams. The system further includes a digital linear tape positioned adjacent the spatial filter with the spatial filter allowing the subset of light beams to hit the digital linear tape and produce servo marks. The spatial filter includes openings positioned to allow the subset of light beams to pass through the filter. The openings may be staggered relative to the digital linear tape to prevent debris generated by the marking process from clogging the openings.

35 Claims, 5 Drawing Sheets

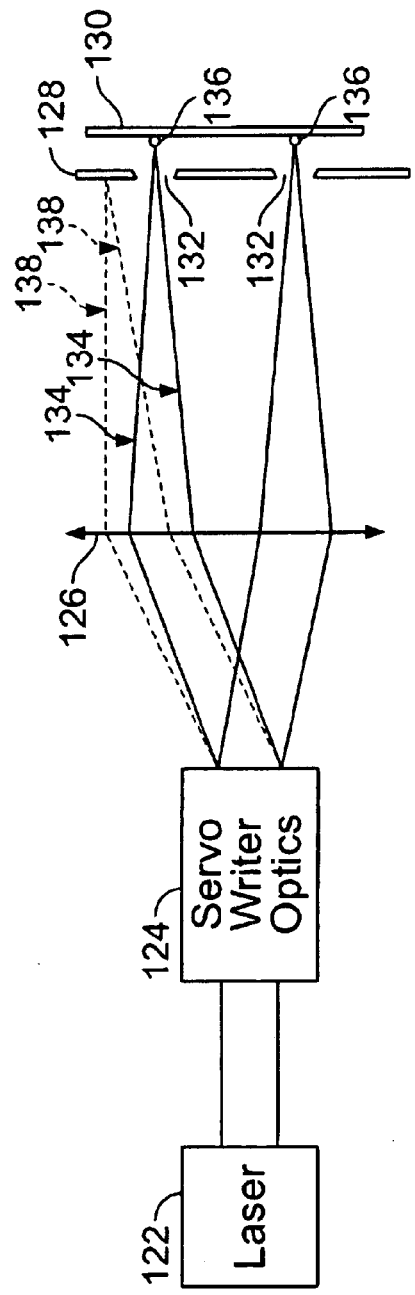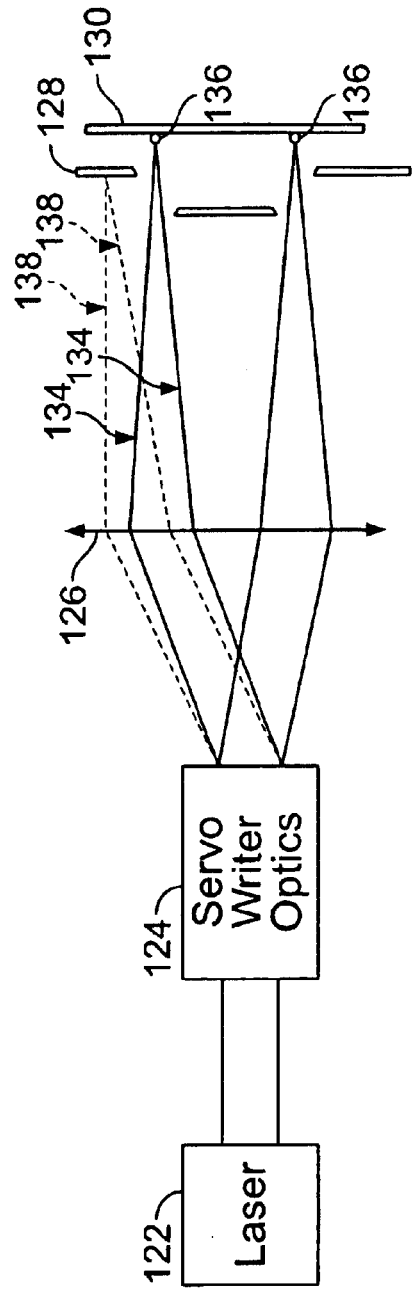

SPATIAL FILTERING OF LASER GHOSTS

BACKGROUND

This invention relates to spatial filtering of laser ghosts.

In a servo writer that is used to write optical servo marks on a digital linear tape, ghost images are produced as a result of the non-ideal phase nature of a beam-generating device or due to the unwanted scattering in the optical system. The ghost images generate unwanted servo marks on the digital linear tape. The unwanted servo marks produced by the ghost images can degrade the tracking resolution and tracking accuracy. In severe cases, it renders optical tracking impossible.

SUMMARY

In a general aspect, the invention features an optical servo writer system including a laser generating beams of collimated light, a lens positioned to receive and focus the collimated light and a spatial filter positioned adjacent the lens to allow a subset of the collimated light to pass through the filter.

In a preferred embodiment, the system further includes an optical subsystem positioned between the laser and the lens, the optical subsystem receiving the beams of collimated light and splitting the beams. The spilt beams include servo beams and ghost beams. The subset is servo beams.

The system may further include a digital linear tape positioned adjacent the spatial filter with the spatial filter allowing the subset of collimated light to hit the digital linear tape and produce servo marks. The optical subsystem includes an attenuator placed in proximity to a beam expander and a diffractive optical element. The optical subsystem includes a bi-prism and several lenses. The spatial filter includes a plurality of openings positioned to allow the subset of collimated light to pass through the filter. The plurality of openings are positioned relative to the plane of the digital linear tape to prevent debris from clogging the openings when the subset of collimated light hits the digital linear tape to produce servo marks. The position of successive openings is staggered relative to the plane of the digital linear tape. The spatial filter includes an ablatable film bonded to a clear substrate.

In another aspect, the invention features an optical system for producing a plurality of servo marks on a digital linear tape including a laser generating beams of collimated light, an optical subsystem positioned to receive the beams of collimated light and split the beams, a lens positioned to receive and focus the split beams and a spatial filter positioned adjacent the lens to allow a subset of the split beams to pass through the filter.

In a preferred embodiment, the split beams include servo beams and ghost beams. The subset is the servo beams. The servo beams hit the digital linear tape. The spatial filter includes a plurality of apertures positioned to allow the subset of split beams to pass through the filter. The plurality of apertures is staggered with respect to each other so as to prevent clogging.

In another aspect, the invention features a method for producing optical servo marks on a digital linear tape including generating beams of collimated light in a laser, receiving and focusing the beams of collimated light in a lens and filtering the beams of collimated light near the focus of the lens to allow a subset of the beams to pass through a filter and hit the digital linear tape.

In a preferred embodiment, generating further includes splitting the beams of collimated light into desired beams and ghost beams. Splitting is accomplished by passing the beams of collimated light through a diffractive optical element. Splitting is accomplished by passing the beams of collimated light through a bi-prism lens to generate two beams that are then brought back together by several lenses to form multiple spots on the tape by means of two-beam interference. The subset of beams is the desired beams. Filtering includes passing the beams of collimated light to a spatial filter. The spatial filter includes a plurality of openings positioned to allow the subset to pass through the filter. The plurality of openings is generated in situ. Generating the openings includes providing a solid spatial filter, generating openings in the spatial filter by allowing the subset to cut through the spatial filter to produce the plurality of openings. The openings are staggered with respect to each other to minimize clogging.

In another aspect, the invention features an optical servo writer system for a digital linear tape including a laser optics system generating beams of collimated light, a first lens positioned to receive and focus the collimated light, a spatial filter positioned adjacent the lens to allow a subset of the collimated light to be focused and pass through the filter and a second lens positioned to restore the subset into collimated beams which propagate towards a third lens.

In a preferred embodiment, the beams include servo beams and ghost beams. The subset is servo beams. The third lens focuses the subset onto the digital linear tape producing servo marks. The laser optics system includes a laser source for producing light to an attenuator and a beam expander for receiving the light and expanding the beam to become a collimated beam with the proper diameter and sending it to a diffractive optical element.

The laser optics system includes a laser source for producing light to a bi-prism lens to generate two beams that are then brought back together by several lenses to form multiple spots on the tape by means of two-beam interference. The spatial filter includes a plurality of openings positioned to allow the subset through the spatial filter. The first lens is a planar-convex lens. The second lens is a planar-convex lens. The third lens is a scan lens.

Embodiments of the invention may have one or more of the following features.

Multiple laser beams are produced from a single laser beam using a bi-prism or a diffractive optical element in a beam-generating device. The beams are focused onto a digital linear tape by a lens to form multiple marks along a line oriented perpendicular to the tape transport direction. An aperture for spatial filtering is used to eliminate ghost beams. The spatial filter is located near, but not at, the focal plane and can eliminate, or at least significantly reduce the marks generated by the ghosts and improve servo resolution.

To insure accurate alignment between the desired beams and the openings in the spatial filter, the openings in the spatial filter can be generated in situ by placing a film supported on a substrate within the path of multiple beams and having them cut through the spatial filter to form the openings. The ghost beams are not of sufficient power to cut through the spatial filter. The spatial filter may also be configured to prevent clogging of its openings by tape debris.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a block diagram of an exemplary optical servo writer system having a spatial filter positioned in close proximity to the tape.

FIG. 4B is a block diagram of an exemplary optical servo writer system adapted to prevent spatial filter clogging when the spatial filter is positioned in close proximity to the tape.

Like reference symbols in the various drawings indicate like elements.

DETAILED DESCRIPTION

Figure 1:
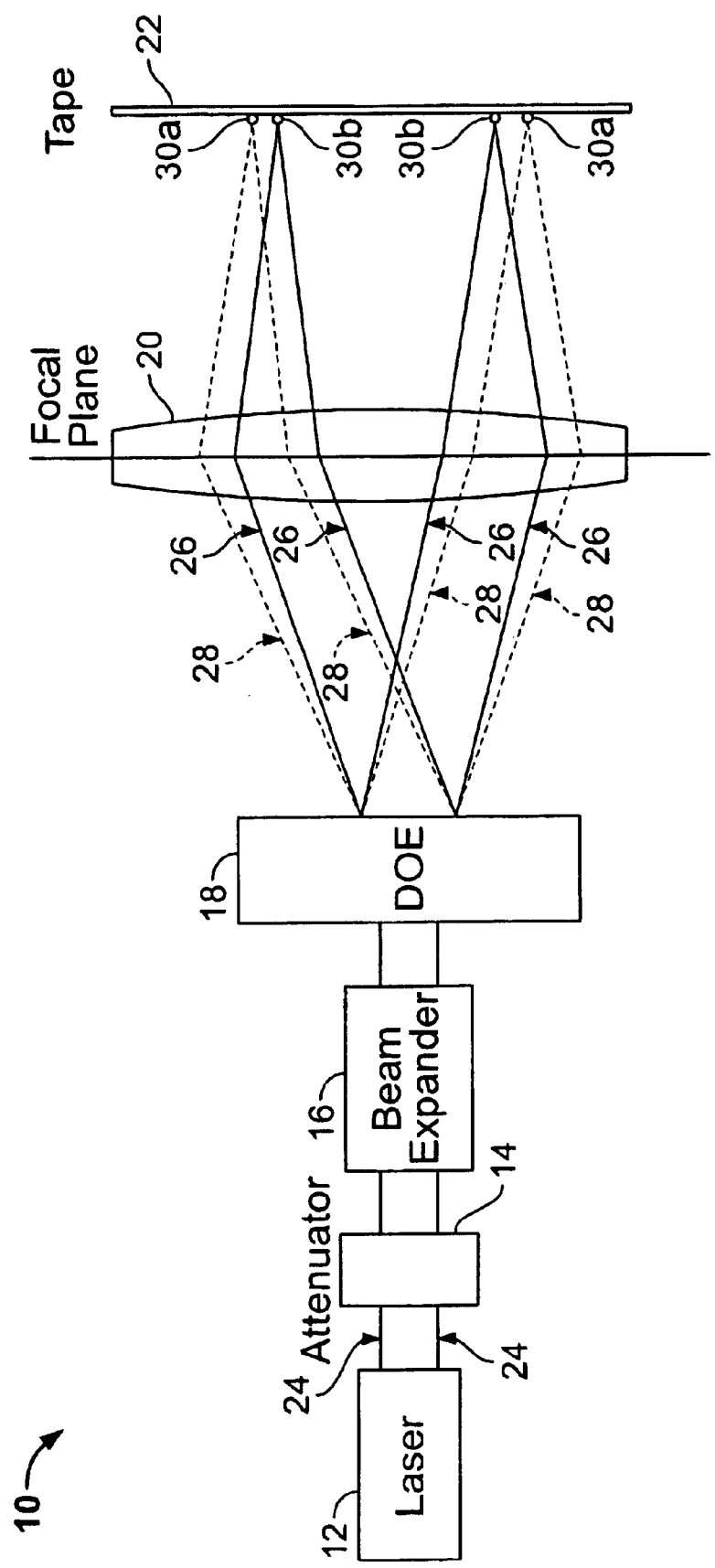
FIG. 1 is a block diagram of a related art optical servo writer system.

Referring to FIG. 1, a block diagram of a related art optical servo writer system 10 includes a laser 12, attenuator 14, a beam expander 16, a diffractive optical element 18 and a lens 20. The system 10 produces optical servo marks on a tape 22. The laser 12 generates optical electromagnetic energy such as coherent collimated light 24 directed toward the attenuator 14. Light emerging from the attenuator 14 is directed toward the beam expander 16. Light coming out of the beam expander 16 is directed toward the diffractive optical element 18, which splits the input beam 24 into multiple beams 26 that have approximately equal powers.

In another embodiment, a bi-prism lens may replace the diffractive optical element 18.

The diffractive optical element 18 is a device that is commercially available. The diffractive optical element 18 has planar elements including zones that retard the incident wave by a modulation of the refractive index or by a modulation of the surface profile. The light emitted from the different zones interferes and forms the desired wave front pattern. One type of diffractive optical element, which splits the incident laser beam to form a multiple or an array of beams with approximate equal intensity and angular separation, is called a Fourier array generator, or fan out element. As the light beam 24 impinges on the diffractive optical element 18 multiple beams 26 are generated.

A diffractive optical element 18 can also generate unwanted beams in addition to the desired multiple beams 26. The unwanted beams are referred to as ghost beams 28. The ghost beams 28 can also be caused by extraneous light scattered from dirt or imperfections in the diffractive optical element 18. The multiple beams 26 and ghost beams 28 travel into the lens 20. The lens 20 has a focal length f and can be a simple planar-convex lens, or a more complex lens such as a scanning lens, depending on the optical field of view and the desired optical spot size. The lens 20 focuses the multiple beams 26 and ghost beams 28 onto the tape 22, generating an array of marks 30 generally referred to as optical servo tracks (or marks). As the tape 22 moves multiple optical servo tracks (continuous) are inscribed on the tape surface. If a pulsed laser 12 is used, intermittent multiple optical servo tracks (intermittent dot marks) can be generated on the tape 22.

The ghost beams 28 may cut the tape 22 and form unwanted marks 30a on the tape 22. A goal of the present invention is to eliminate the ghost beams 28 so that they will not impinge upon the tape 22 and generate unwanted marks 30a.

Figure 2:
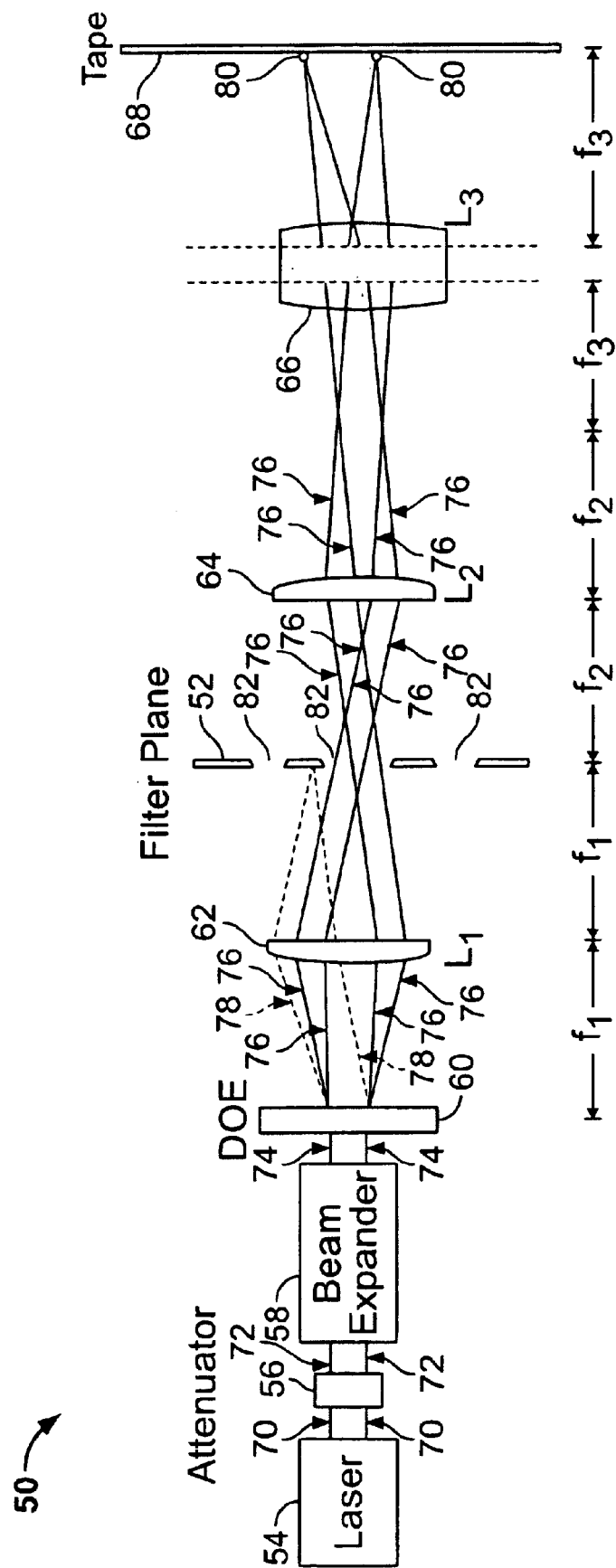
FIG. 2 is a block diagram of an exemplary optical servo writer system having a diffractive optical element and a ghost-eliminating spatial filter.

Referring to FIG. 2, an optical servo writer system 50 includes a laser 54, attenuator 56, beam expander 58, a diffractive optical element 60, and three lenses 62, 64 and 66. The system 50 is used to produce optical servo marks 80 on a tape 68. The laser 54 generates a beam of collimated light 70 directed toward the attenuator 56. Light 72 leaving the attenuator 56 is directed toward the beam expander 58. Light 74 coming out of the beam expander 58 is directed toward the diffractive optical element 60 where it is split into desired beams 76, i.e., servo beams, and undesired beams 78, i.e., ghost beams. The beams 76 and 78 pass toward the lens 62 and the desired beams 76 pass through a spatial filter 52.

The spatial filter 52 includes one or more openings (also known as spatial filter openings or apertures) 82 that are spaced along the filter 52 to allow the desired beams 76 to pass towards the lens 64 while blocking the undesired ghost beams 78. The spatial filter 52 can take on several forms. One example is a simple mechanical slit. Etching the desired filter pattern onto a glass coated with an opaque thin film, such as Chromium, or Gold, or silver, or other suitable alloy could generate another example filter. Any suitable film placed on a stable optically transparent substrate may be used as the spatial filter 52. Yet another example is an ablatable film placed on a stable optically transparent substrate from which the filter is generated by the forming beam itself. The desired beams 76 travel from the lens 64 to lens 66 and impact the tape 68 generating useful marks on the tape 68. These marks are known as optical servo marks 80. The placement of the spatial filter 52 in the beam path allows the desired beams 76 to "cut" the tape 68 to generate useful marks 80 while preventing the undesired ghost beams 78 from passing on to cut the tape 68 and form unwanted marks. Each of the openings 82 are sized to be just larger than the diameter of the desired beams 76 at their focal points.

In an example, lens 62 and 64 are spherical lenses having equal focal points, i.e., $f_1 = f_2$, such as planar-convex lenses, for example, and lens 66 is a scan lens. In general, f1 and f2 need not be equal to each other.

The principle of forming a spatial filter by the ablatable film is described here. The spatial filter 52 can be generated in situ by placing a solid ablatable film in the optical servo writer system 50. As the desired beams 76 cross the solid ablatable film one or more openings 82 are generated by the selected beams 76; this ablatable film with openings 82 now becomes the spatial filter 52. However, no openings 82 are generated by the ghost beams 78 because they are of much weaker power than the desired beams 76 and thus, due to the characteristics of the film used in the spatial filter 52, cannot penetrate or cut through the ablatable film to provide the necessary openings 82.

Figure 3:
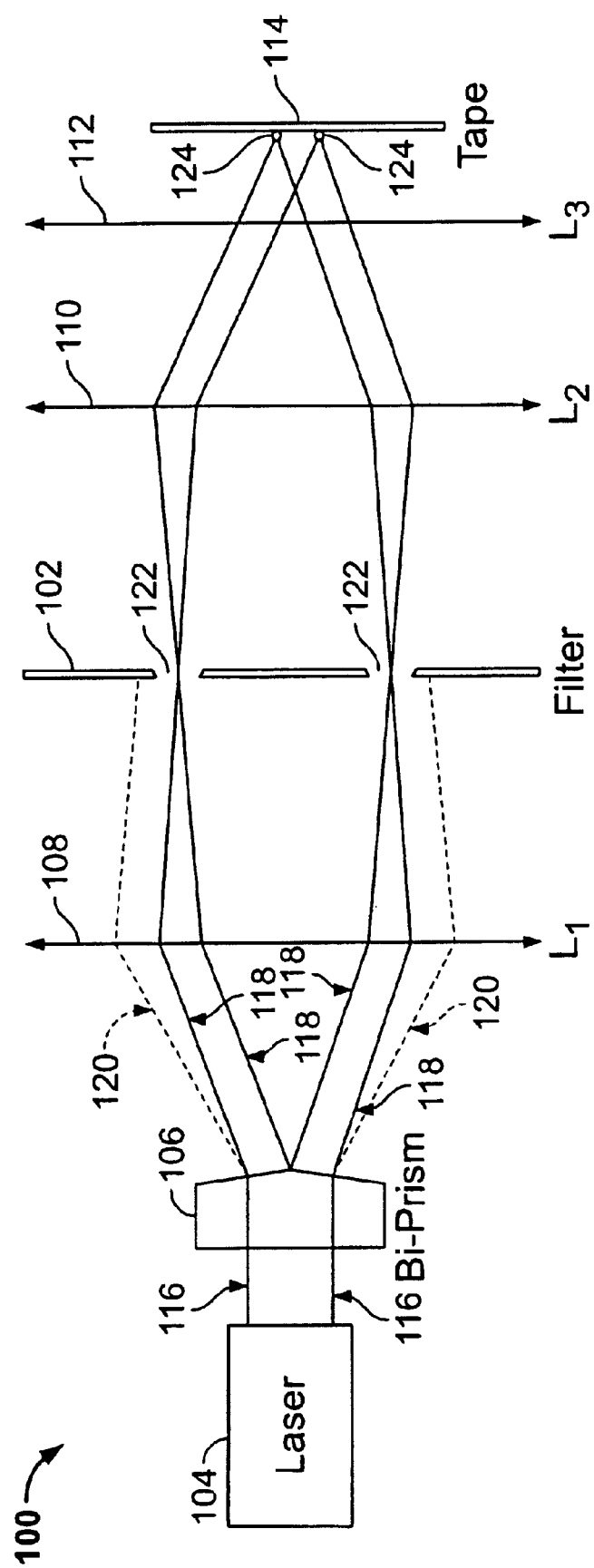
FIG. 3 is a block diagram of an exemplary optical servo writer system having a bi-prism lens and ghost-eliminating spatial filter.

Referring to FIG. 3, a second exemplary optical servo writer system 100 includes a laser 104, a bi-prism 106, and lenses 108, 110 and 112 to produce optical servo marks 124 on a tape 114. The laser 104 generates a beam of light 116 directed towards the bi-prism 106, which splits the light 116 into desired beams 118 and unwanted ghost beams 120. The desired beams 118 and ghost beams 120 pass through the lens 108 and onto the spatial filter 102. The spatial filter 102 contains two openings 122 positioned to allow the desired beams 118 to pass to the lens 110 while preventing the unwanted ghost beams 120 from passing further toward the tape 114. The two beams 118 pass from the lens 110 to the cylinder lens 112 and onto the tape 114 where they generate multiple servo marks 124 by means of two-beam interference.

Referring to FIG. 4A, an optical servo writer system 120 includes a laser 122, servo writer optics 124, a lens 126 and a spatial filter 128 to produce optical servo marks 136 on a tape 130. The servo writer optics 124 is considerably simpler when the special filter 128 is placed in close proximity to the tape 130. As described above, the spatial filter 128 includes openings 132 positioned to allow desired beams 134 to pass and cut or etch the tape 130 to generate servo marks 136 while excluding ghost beams 138 from generating unwanted servo marks.

As the multiple beams 134 cut the tape 130 to generate the servo marks 136, pieces of tape debris may clog the openings 132 when the spatial filter 128 is positioned in close proximity to the tape 130. Referring to FIG. 4B, a system 150 to avoid this problem is shown, where the spatial filter 128 is positioned such that the multiple openings 132 are staggered with respect to each other and to the cross-sections of the beams 134 and 138. Thus, upper and lower parts of the spatial filter 128 are sheared along the focus of the lens 126 producing, in effect, a staggering of the openings 132. The diagonal positioning, i.e., the shearing, of the spatial filter 128 is dependent upon the separation between the desired beams 134 and the ghost beams 138. With such an arrangement, tape debris generated during the cutting of the tape by the desired beams 134 is prevented from clogging the openings 132 in the spatial filter 128 because of their staggered positioning with respect to each other.

Figure 5:
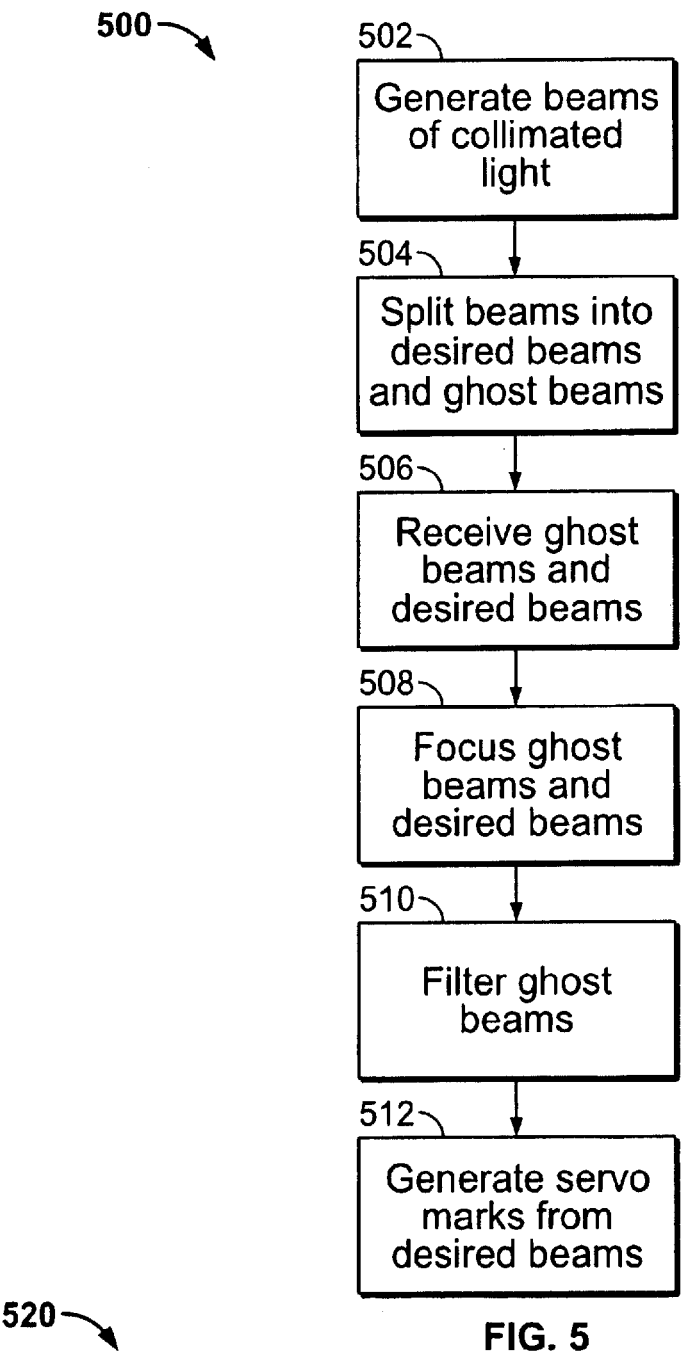
FIG. 5 is a flow diagram of a spatial filtering process to remove ghost beams.

Referring to FIG. 5, a process 500 for spatial filtering of laser ghosts in an optical servo writer includes generating 502 beams of collimated light in a laser. The process 500 splits 504 the beams of collimated light in an optical subsystem, producing desired beams and ghost beams. The process 500 receives 506 the desired beams and the ghost beams and focuses 508 the desired beams and ghost beams in a lens. The process 500 filters 510 the ghost beams by allowing the desired beams to pass through openings of a spatial filter positioned adjacent the lens. Servo marks are generated 512 on a digital linear tape positioned adjacent the spatial filter by the desired beams hitting the digital linear tape.

Alignment of the openings with the desired beams is important so that the ghost beams are not allowed to pass on to the digital linear tape and generate undesirable ghost servo marks that can degrade tracking resolution and tracking accuracy when optical servo marks are used to position the digital linear tape in relation to a magnetic recording head by an optical servo system. Proper alignment of the desired beams to the openings may be accomplished by generating the openings of the spatial filter in situ along with a knowledge that the ghost beams are of considerably less power than the desired beams.

Figure 6:
FIG. 6 is a flow diagram of a process to generate openings in a spatial filter in situ.

Referring to FIG. 6, a process 520 of generating in situ openings in a spatial filter residing in an optical servo writer system includes positioning 522 a solid spatial filter at the focal plane of a lens, such as the filter plane in FIG. 2. Desired beams and ghost beams are passed 524 to the solid spatial filter. The desired beams cut through 526 the solid spatial filter to produce openings in the spatial filter. The ghost beams, being of considerably less power than the desired beams, fail to cut through the spatial filter and are thus blocked by the spatial filter.

It is understood that while the invention has been described in conjunction with the detailed description thereof, the foregoing description is intended to illustrate and not limit the scope of the invention, which is defined by the scope of the appended claims. Other aspects, advantages and modifications are within the scope of the following claims.

What is claimed is:

1. An optical servo writer system comprises:
    a laser generating beams of collimated light;
    a lens positioned to receive and focus the collimated light; and
    a spatial filter positioned adjacent the lens to allow a subset of the collimated light to pass through the filter, wherein the spatial filter comprises an ablatable film bonded to a clear substrate.

2. The system of claim 1 further comprising an optical subsystem positioned between the laser and the lens, the optical subsystem receiving the beams of collimated light and splitting the beams.

3. The system of claim 2 wherein the split beams comprise servo beams and ghost beams.

4. The system of claim 3 wherein the subset is servo beams.

5. The system of claim 2 wherein the optical subsystem comprises an attenuator placed in proximity to a beam expander and a diffractive optical element.

6. The system of claim 2 wherein the optical subsystem comprises a bi-prism and several lenses.

7. The system of claim 1 further comprising a digital linear tape positioned adjacent the spatial filter with the spatial filter allowing the subset of collimated light to hit the digital linear tape and produce servo marks.

8. The system of claim 4, wherein the spatial filter includes a plurality of openings positioned to allow the subset of collimated light to pass through the filter.

9. The system of claim 8 wherein the plurality of openings are positioned relative to the plane of the digital linear tape to prevent debris from clogging the openings when the subset of collimated light hits the digital linear tape to produce servo marks.

10. The system of claim 9 wherein the position of the successive openings are staggered relative to the plane of the digital linear tape.

11. An optical system for producing a plurality of servo marks on a digital linear tape comprises:
    a laser generating beams of collimated light;
    an optical subsystem positioned to receive the beams of collimated light and split the beams;
    a lens positioned to receive and focus the split beams; and
    a spatial filter positioned adjacent the lens to allow a subset of the split beams to pass through the filter, wherein the spatial filter comprises an ablatable film bonded to a clear substrate.

12. The system of claim 11 wherein the split beams include servo beams and ghost beams.

13. The system of claim 12 wherein the subset is the servo beams.

14. The system of claim 13 wherein the servo beams hit the digital linear tape.

15. The system of claim 11 wherein the spatial filter includes a plurality of apertures positioned to allow the subset of split beams to pass through the filter.

16. The system of claim 15 where the plurality of apertures are staggered with respect to each other so as to prevent clogging.

17. A method for producing optical servo marks on a digital linear tape comprises:

generating beams of collimated light in a laser;

receiving and focusing the beams of collimated light in a lens; and filtering the beams of collimated light near the focus of the lens to allow a subset of the beams to pass through a filter and hit the digital linear tape, wherein filtering comprises passing the beams of collimated light to a spatial filter, the spatial filter comprising an ablatable film bonded to a clear substrate.

18. The method of claim 17 wherein generating further comprises splitting the beams of collimated light into desired beams and ghost beams.

19. The method of claim 18 wherein splitting is accomplished by passing the beams of collimated light through a diffractive optical element.

20. The method of claim 18 wherein splitting is accomplished by passing the beams of collimated light through a bi-prism lens to generate two beams which are then brought back together by several lenses to form multiple spots on the tape by means of two beam interference.

21. The method of claim 17 wherein the subset of beams is the desired beams.

22. The method of claim 17 wherein the spatial filter includes a plurality of openings positioned to allow the subset to pass through the filter.

23. The method of 22 wherein the plurality of openings are generated in situ.

24. The method of claim 17 wherein generating the openings comprises:

providing a solid spatial filter;

generating openings in the spatial filter by allowing the subset to cut through the spatial filter to produce the plurality of openings.

25. The method of claim 22 wherein the openings are staggered with respect to each other to minimize clogging.

26. An optical servo writer system for a digital linear tape comprises:

a laser optics system generating beams of collimated light;

a first lens positioned to receive and focus the collimated light;

a spatial filter positioned adjacent the lens to allow a subset of the collimated light to be focused and pass through the filter, wherein the spatial filter comprises an ablatable film bonded to a clear substrate; and a second lens positioned to restore the subset into collimated beams that propagate towards a third lens.

27. The system of claim 26 wherein the beams comprise servo beams and ghost beams.

28. The system of claim 27 wherein the subset is servo beams.

29. The system of claim 28 wherein the third lens focuses the subset onto the digital linear tape producing servo marks.

30. The system of claim 26 wherein the laser optics system comprises:

a laser source for producing light to an attenuator; and a beam expander for receiving the light and expanding the beam to become a collimated beam with the proper diameter and sending it to a diffractive optical element.

31. The system of claim 26 wherein the laser optics system comprises a laser source for producing light to a bi-prism lens to generate two beams which are then brought back together by several lenses to form multiple spots on the tape by means of two beam interference.

32. The system of claim 26 wherein the spatial filter includes a plurality of openings positioned to allow the subset through the spatial filter.

33. The system of claim 26 wherein the first lens is a planar-convex lens.

34. The system of claim 26 wherein the second lens is a planar-convex lens.

35. The system of claim 26 wherein the third lens is a scan lens.

* * * * *